W. C. LEWMAN.
Hand-Seeder.
No. 61,076.
Patented Jan. 8, 1867
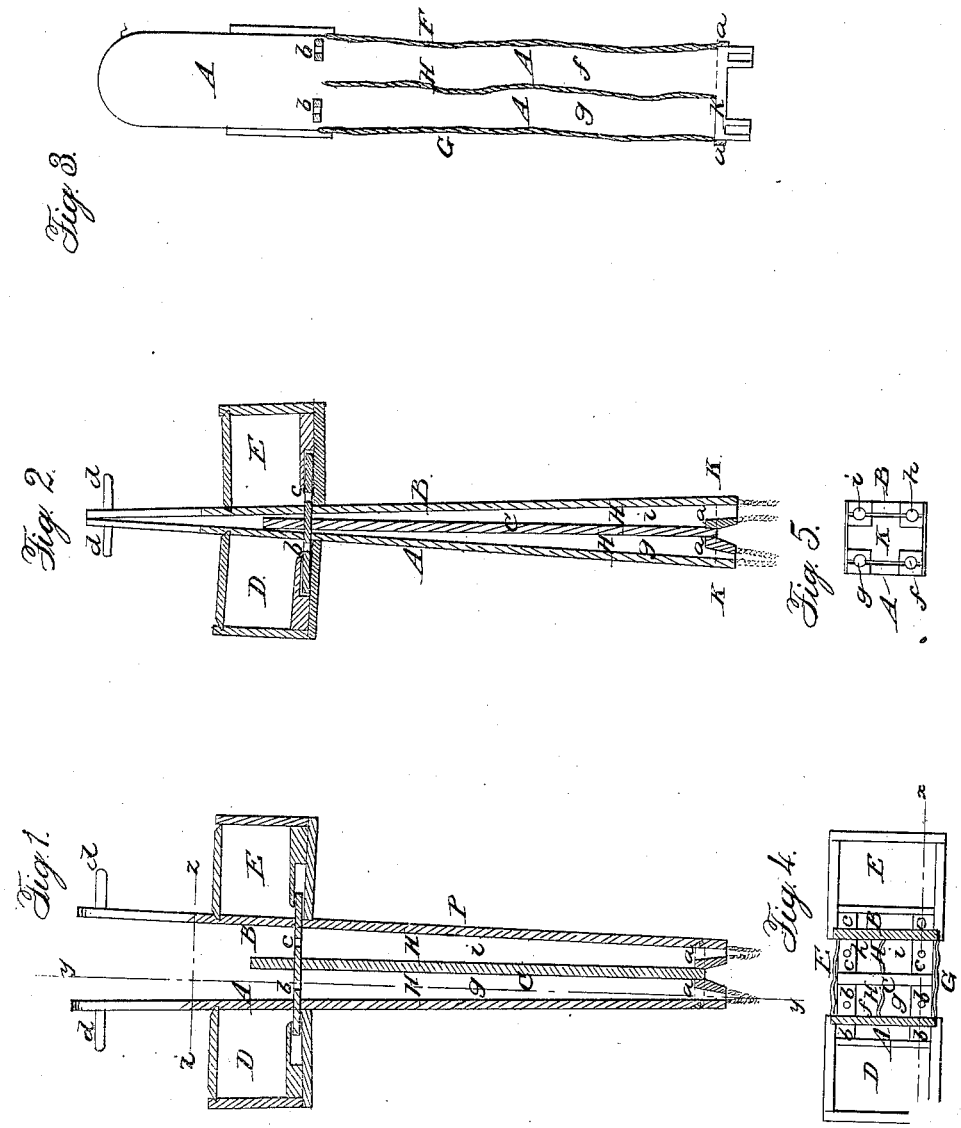

United States Patent Office.

WILLIAM C. LEWMAN, OF KANSAS, OHIO.

Letters Patent No. 61,076, dated January 8, 1867.

IMPROVEMENT IN HAND CORN-PLANTER.

*The Schedule referred to in these Letters Patent and making part of the same.*

TO ALL WHOM IT MAY CONCERN:

Be it known that I, WILLIAM C. LEWMAN, of Kansas, in the county of Seneca, and State of Ohio, have invented a new and improved Hand Corn-Planter; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved corn-planter, taken on the line $x\ x$, fig. 4, the handles $d\ d$ being spread apart.

Figure 2 is a similar view, the handles being brought close together.

Figure 3 is a vertical cross-section of the same, taken on the line $y\ y$, fig. 1.

Figure 4 is a horizontal sectional view, the plane of section indicated by the line $z\ z$, fig. 1.

Figure 5 is a bottom view of the droppers or distributing tubes.

Similar letters of reference indicate like parts.

This invention relates to an improvement on a hand corn-planter, Letters Patent for which were granted to William Douglass, of Westport, Missouri, dated July, 1861.

The object of my invention is to construct on the principle of the said Douglass patent a hand corn-planter, by means of which four or eight grains are planted in a hill, each grain (or two) planted three or four inches apart from the others in a square.

The invention consists in attaching one seed-box to each of the two blades which form two sides of the distributing tubes. The space between the blades is divided in two by means of a middle blade, to which four seed-slides are attached, two slides operating in each seed-box. Each of the divisions formed by the middle blade is again divided transversely in two parts by some flexible material, whereby four separate distributing tubes are constructed, each one being fed by one of the seed-slides. The side blades are pivoted to a cross-plate at the bottom, and are operated by appropriate handles at the top.

I am aware that hand corn-planters have been patented and are in use in which the grain is distributed by four separate tubes; but the tubes are in one line, and do not form a square, as they do in my planter, which is of great importance; for by planting four grains in one line the corn will not, when grown, stand so that one stalk will support the other, but each will actually stand independent of the others. If, though, planted at equal distances from a given centre in each hill, as they are by my machine, the stalks will afterwards, when grown, support and lean against one another.

A and B are the blades, which are pivoted at the bottom to two braces or bars, $a\ a$. By these same braces is supported and held the centre blade C, to the upper end of which the four seed-slides $b\ b$ and $c\ c$ are firmly attached. To each of the blades A and B is secured one seed-box, viz, D and E. To the upper end of each side blade is attached a handle, $d$. When these handles are pulled apart (figs. 1 and 4) the slides $b$ and $c$ are pulled out of the seed-boxes sufficiently far to drop the grain into the tubes. These tubes are surrounded by the blades A and B and side walls F and G, the latter made of leather or some other flexible material. This square tube is divided by the centre blade C, and each of the two tubes thus formed is again subdivided by a flexible (leather) strap or partition, H, whereby are formed four distinct distributing tubes, $f\ g\ h$ and $i$. (See figs. 4 and 5.) The bottom of these tubes is closed by a board, K, (fig. 5,) in the sides of which half-circular grooves or holes are left, one for each tube, and each corresponding with a similar groove in the side blades A and B, (figs. 3 and 5.) The tubes extend below the board K, as seen, and to the bottom of each should be attached a pair of shovels, (shown in red lines in figs. 1 and 2.) The machine is operated like that of the aforesaid William Douglass. But it drops at once and simultaneously four grains or four sets of grain into four different tubes, thereby planting four grains into each hill at equal distances from the centre.

I claim as new, and desire to secure by Letters Patent—

A hand corn-planter which is composed of the blades A B and C, of the flexible partitions or walls F G and H, and the four seed-slides $b\ b$ and $c\ c$, which slide in the seed-boxes D and E, all made and operating substantially as and for the purpose herein shown and described.

WM. C. LEWMAN.

Witnesses:
D. J. GOODSELL,
H. H. GOODSELL.